United States Patent Office

3,590,048
Patented June 29, 1971

---

3,590,048
SUBSTITUTED THIOPYRANO[2,3-c]PYRAZOLES
Leo Ralph Swett and James Daniel Ratajczyk, Waukegan, Ill., assignors to Abbott Laboratories, North Chicago, Ill.
No Drawing. Filed Apr. 1, 1968, Ser. No. 717,813
Int. Cl. C07d 65/08
U.S. Cl. 260—310                            4 Claims

---

ABSTRACT OF THE DISCLOSURE

1,3-disubstituted - 5,6 - dihydrothiopyrano[2,3-c] pyrazoles are synthesized from the new 3-[(1,3-disubstituted-5 - pyrazolyl)thio]propionic acids described. The new fused-ring compounds have excellent anti-inflammatory activity; they relieve edemas and are also useful as antipyretics and analgesics.

---

The present invention is directed to compounds of the formula

I
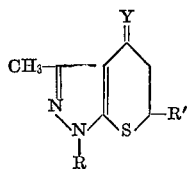

wherein is methyl or phenyl, R' is hydrogen or methyl, and Y is oxygen or

The new compounds are useful as antipyretics, analgesics and anti-inflammatories. The invention is also directed to the process of making the compounds of the above formula and to the intermediates of the formula II
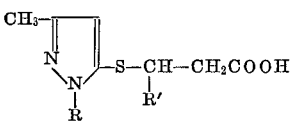

wherein R and R' have the above-identified meaning, which are used in this process.

In a general embodiment, the above intermediates are made from the corresponding 1 - substituted-3-methyl-2-pyrazoline-5-thione which in turn is made from the corresponding 5-pyrazolone with phosphorous pentasulfied. The pyrazoline-5-thione is then reacted with 3-bromopropionic acid or 3-bromobutyric acid. Ring closure of these pyrazolylthiopropionic acid derivatives with polyphosphoric acid produces the compounds of Formula I wherein Y is oxygen. Reduction of these ketones with lithium aluminum hydride produces the compounds of Formula I wherein Y is

The new compounds exhibit anti-inflammatory and antipyretic activity when administered to warm-blooded animals at oral dosages of 25–100 mg./kg.; at oral dosages above 100 mg./kg. the new compounds also show analgesic effects and reduce capillary permeability. The compounds of Formula I wherein Y is oxygen are generally more effective, i.e., their effective dosage level is lower than that established for the compounds of Formula I wherein Y is

The new compounds are particularly interesting as antiinflammatories and antipyretics because their therapeutic index is very high (the compounds of Formula I have oral toxicities between 900 and 2,000 mg./kg.), and because they exhibit their activity at low oral dosages.

The following examples are given as illustrations for the preparations of the new intermediates of Formula II and the anti-inflammatory compounds of Formula I. However, these examples are not intended to limit the invention in any respect. In all examples, the analytical values are found to be in good agreement with the compounds of the assigned structure.

EXAMPLE 1

1,3-dimethyl-2-pyrazoline-5-thione

To a stirred solution of 112.1 g. of 1,3-dimethyl-2-pyrazolin-5-one in 1,500 ml. of refluxing xylene is added 87 g. of phosphorous pentasulfide. The resulting mixture is stirred another 45 minutes under reflux and then allowed to settle. The hot xylene layer is decanted from the formed sludge and concentrated under reduced pressure. The obtained residue from the xylene concentrate is crystallized from a minimum amount of hot isopropyl alcohol, resulting in 11.0 g. of pure 1,3-dimethyl-2-pyrazoline-5-thione, melting at 133.5–134.5° C.

EXAMPLE 2

3-[(1,3-dimethyl-5-pyrazolyl)thio]propionic acid

To a solution of 15.1 g. of sodium bicarbonate in 300 ml. of water is added 20.5 g. of 1,3-dimethyl-2-pyrazoline-5-thione and the mixture is heated with stirring to 70° C. A solution of 24.5 g. of 3-bromopropionic acid in 300 ml. of water containing 13.5 g. of sodium bicarbonate is then added at once to the above hot mixture and stirring is continued at 70° C. for three hours. Filtration of the hot solution removes a small amount of insoluble material. The filtrate is chilled and acidified with glacial acetic acid to give 26.7 g. (84% of theory) of pure 3-[(1,3-dimethyl-5-pyrazolyl)thio] propionic acid, melting at 127–128° C.

EXAMPLE 3

5,6-dihydro-1,3-dimethylthiopyrano[2,3-c]pyrazol-4(1H)-one

A mixture of 20 g. of 3-[(1,3-dimethyl-5-pyrazolyl) thio]-propionic acid and 250 g. of polyphosphoric acid is heated for one hour to 145° C. and subsequently poured onto crushed ice. The resulting clear solution is neutralized with a 50% aqueous sodium hydroxide solution while being chilled in an ice bath. The crude ketone is crystallized from water with charcoal treatment to produce 12.9 g. (71% of theory) of pure, colorless needles of 5,6-dihydro - 1,3 - dimethylthiopyrano[2,3 - c]pyrazol-4(1H)-one, melting at 113–114° C.

EXAMPLE 4

1,4,5,6-tetrahydro-1,3-dimethylthiopyrano[2,3-c]pyrazol-4-ol

To a suspension of 1.2 g. of lithium aluminum hydride in 250 ml. of anhydrous ether is added, portionwise, 4.5 g. of 5,6-dihydro-1,3-dimethylthiopyrano[2,3 - c]pyrazol-4 (1H)-one and the mixture is refluxed for 4 hours. Subsequently, the excess lithium aluminum hydride is decomposed by the addition of 1.1 ml. of water, and a solution of 1.1 ml. of 15% aqueous sodium hydride and 3.3 ml. of water is added before the mixture is filtered. The filtrate is evaporated to dryness under reduced pressure and the residue is crystallized by dissolving it in the minimum amount of benzene and inducing crystallization by the addition of hexane to give 3.7 g. of 1,4,5,6-tetrahydro-1,3-dimethylthiopyrano[2,3 - c]pyrazol - 4 - ol, melting at 95–96° C.

EXAMPLE 5

3-[(1,3-dimethyl-5-pyrazolyl)thio]butyric acid

Following the procedure of Example 2 but replacing the 3-bromopropionic acid used there with an equivalent amount of 3-bromobutyric acid produces 3-[(1,3-dimethyl-5-pyrazolyl)thio]butyric acid. The pure material is obtained in a yield of 61% of theory as a yellow oil boiling at 160–180° C. under 1–4 mm. pressure.

EXAMPLE 6

5,6-dihydro-1,3,6-trimethylthiopyrano-[2,3-c]pyrazol-4-(1H)-one

By following the procedure of Example 3 with the compound of Example 5, 5,6-dihydro-1,3,6-trimethylthiopyrano[2,3-c]pyrazol-4(1H)-one is obtained in a yield of 53.3% of theory after crystallizing the crude product from water. The pure compound melts at 101.5–102.5° C.

EXAMPLE 7

1,4,5,6-tetrahydro-1,3,6-trimethylthiopyrano-[2,3-c]pyrazol-4-ol

By reducing 6.9 g. of the compound of Example 6 by the method of Example 4 using 1.5 g. of lithium aluminum hydride, a mixture of the cis and trans isomers of 1,4,5,6 - tetrahydro - 1,3,6 - trimethylthiopyrano[2,3-c]pyrazol-4-ol is obtained in a yield of 2.4 g. The mixture has an indefinite melting point but analysis and the infrared spectrum confirm the structure of the desired compound.

EXAMPLE 8

3-[(3-methyl-1-phenyl-5-pyrazolyl)thio]propionic acid 3-methyl-1-phenyl-2-pyrazoline-5-thione is made from 3-methyl-1-phenyl-2-pyrazolin-5-one and phosphorous pentasulfide in accordance with the process of Example 1. The pure compound, crystallized from ethanol, melts at 110–112° C.

By following the procedures of Example 2 using 35.7 g. of the above thione and 29.0 g. of 3-bromopropionic acid, 3 - [(3-methyl-1-phenyl-5-pyrazolyl)thio]propionic acid is obtained in a yield of 38.4 g. after crystallizing the crude material from ethylacetate/hexane; it melts at 105–107° C.

EXAMPLE 9

5,6-dihydro-3-methyl-1-phenylthiopyrano-[2,3-c]pyrazol-4(1H)-one

Following the procedure of Example 3 with 92.0 g. of the material of Example 8 and 1,565 g. of polyphosphoric acid, crude 5,6-dihydro-3-methyl-1-phenylthiopyrano[2,3-c]pyrazol-4(1H)-one is obtained which, after crystallization from aqueous ethanol, weighs 74.0 g.; it melts at 124.5–126.5° C.

EXAMPLE 10

1,4,5,6-tetrahydro-3-methyl-1-phenylthiopyrano[2,3-c]pyrazol-4-ol

The compound of Example 9 is reduced in accordance with the procedure of Example 4 to produce 1,4,5,6-tetrahydro-3-methyl-1-phenylthiopyrano[2,3-c]pyrazol-4-ol in a yield of 83% of theory after crystallizing the crude material from benzene/hexane. The pure material melts at 144–145° C.

EXAMPLE 11

The anti-edema effect of the above compounds is established by the following procedure: edema is produced in the paws of rats by the injection of carrageenan according to the method described by Winter et al. (Proc., Soc., Exp. Biol., Med., 1962, volume 111, page 544). The test compounds are administered orally at various dosages (6 rats per dosage) 30 minutes prior to the administration of the edema-producing carrageenan. Edema is expressed as percent increase over normal paw size; edema inhibition is calculated from the difference between the average edema size of the control group and the average edema size of the test group. The $ED_{25}$ (i.e., the dose required to produce 25% edema size reduction) is determined from a dosage/effect curve drawn on logarithmic graph paper. In this manner, the $ED_{25}$ of the compound of Example 6 is established to be 49 mg./kg. orally; the $ED_{25}$ of the compound of Example 3 is determined to be 60 mg./kg. orally. With the compounds of Example 4, 15% edema size reduction is found at 100 mg./kg. orally.

EXAMPLE 12

The antipyretic activity of the compounds described above is established in the following manner: fever is produced in rats by intramuscular injections of an aqueous suspension of brewer's yeast. After fever has stabilized, the test compounds are administered orally. Rectal temperatures are taken 1, 2 and 3 hours after drug administration. The 3-hour reading is used to calculate fever and percent reduction between the test group and a control group of animals, each group comprising 4–6 rats per group.

The $ED_{50}$ (50% reduction of fever) for the compound of Example 6 is found to be at 50 mg./kg. orally; with the compound of Example 3, a 15% reduction of fever is found at 50 mg./kg. orally.

EXAMPLE 13

Analgesic and reduction of capillary permeability produced with the compounds of the present invention is established by a modification of the method described by Whittle (Brit. J. Pharm., 1964, volume 22, page 246): Mice are pre-treated with the test compound or a placebo by oral administration thereof. Twenty minutes later, the mice are injected intravenously with 100 mg./kg. of a 1% Evans Blue solution in isotonic saline followed in 10 minutes by an intraperitoneal injection of 0.4 ml. of 0.5% aqueous acetic acid. Writhing produced by the acid is counted for a period of 20 minutes. Analgesic effect is the percent inhibition of writhes calculated from the difference between the control group and the test groups. Inhibition of permeability is calculated as the percent inhibition of dye leakage into the peritoneal cavity. Each group of test and control animals comprises 5 mice.

The analgesic $ED_{50}$ for the compound of Example 6, established in this manner, is 120 mg./kg. orally and the $ED_{50}$ for capillary permeability (calculated dose which inhibits 50% dye leakage) is found to be at 220 mg./kg. orally; the analgesic $ED_{50}$ of the compound of Example 3 is 170 mg./kg. orally and the capillary permeability is found to be 180 mg./kg. orally.

The process of making the compounds of Formula I from the new intermediates of Formula II requires no solvent and is simply carried out by treating the intermediate with an at least about 10-fold excess by weight of polyphosphoric acid. Excellent results are obtained by using a 10- to 12-fold excess of polyphosphoric acid based on the weight of the intermediate but no undue effect is apparent if a 20-fold excess of polyphosphoric acid is used. The two reactants are heated for at least 30 minutes to a temperature of between 100° and 160° C. Heating beyond three hours serves no beneficial purpose and temperatures above 160° C. should be avoided in order to reduce possible by-product formation.

We claim:
1. A compound of the formula

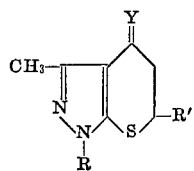

wherein R is methyl or phenyl, R' is hydrogen or methyl, and Y is oxygen or

2. The compound of claim 1 wherein R is phenyl, R' is hydrogen and Y is oxygen.
3. The compound of claim 1 wherein R is methyl, R' is hydrogen and Y is oxygen.
4. The compound of claim 1 wherein R and R' both are methyl and Y is oxygen.

References Cited

Bülow et al., Chem. Abst., vol. 12, p. 2562 (1918).
Eistert et al., Liebigs Ann. Chemie vol. 666, pp. 97–99 and 105 relied on (1963).
Fauran et al., Chem. Abst. vol. 60 column 8013 (1964).
Patterson et al., The Ring Index, 2nd ed., pp. 158–9, Washington, D.C., Amer. Chem. Soc. 1960.
Ziegler et al., Chem. Abst. vol. 57, columns 7259–61 (1962).

NATALIE TROUSOF, Primary Examiner

U.S. Cl. X.R.
424—273